US012696013B2

(12) United States Patent
Reinhard et al.

(10) Patent No.: US 12,696,013 B2
(45) Date of Patent: Jul. 28, 2026

(54) FIXED SYSTEM ENERGY CONSUMPTION IN MULTI-USER ENERGY CONSUMPTION REPORTING

(71) Applicant: InterDigital Patent Holdings, Inc., Wilmington, DE (US)

(72) Inventors: Erik Reinhard, Hédé-Bazouges (FR); William Redmann, Wilmington, DE (US); Claire-Helene Demarty, Montreuil le Gast (FR); Laurent Blondé, Thorigne-Fouillard (FR); Franck Aumont, Vern sur Seiche (FR); Olivier Le Meur, Talensac (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 19/010,510

(22) Filed: Jan. 6, 2025

(65) Prior Publication Data

US 2026/0197564 A1 Jul. 9, 2026

(51) Int. Cl.
*H04Q 9/00* (2006.01)
(52) U.S. Cl.
CPC ..................................... *H04Q 9/00* (2013.01)
(58) Field of Classification Search
CPC ........................................................ H04Q 9/00
See application file for complete search history.

(56) References Cited

U.S. PATENT DOCUMENTS

2006/0277423 A1* 12/2006 Downey ............... G06F 1/3215
713/300

2012/0176252 A1* 7/2012 Drew ................. G05D 23/1902
700/278
2014/0188563 A1 7/2014 Dantressangle et al.
2015/0032279 A1* 1/2015 Striuli ....................... H02J 4/00
700/295
2019/0372345 A1* 12/2019 Bain ....................... H02J 3/008
2020/0057771 A1* 2/2020 Shilts ................... G06F 16/283

FOREIGN PATENT DOCUMENTS

WO 2011005863 A2 1/2011

OTHER PUBLICATIONS

Carbon Trust, "Carbon impact of video streaming," pp. 1-102 (Jun. 2021).

* cited by examiner

*Primary Examiner* — Amine Benlagsir
(74) *Attorney, Agent, or Firm* — VOLPE KOENIG

(57) ABSTRACT

Disclosed herein are methods and apparatus of reporting the energy consumption of individual customers of a multi-user installation, including determining the fixed system energy consumption of the installation attributable to the individual customers. In an example, a device determines a base load energy of a data transmission system over a time interval. Further, the device generates a report of energy consumption attributed to a customer of the data transmission system based on the base load energy of the data transmission system over the time interval weighted by a fraction of a capacity hired by the customer, and the energy attributable to data of the customer transmitted at a determined data rate over the time interval. In a further example, the report of energy consumption attributed to the customer is generated further based on an actual data rate of the data of the customer.

18 Claims, 8 Drawing Sheets

FIXED SYSTEM ENERGY CONSUMPTION IN MULTI-USER ENERGY CONSUMPTION REPORTING

BACKGROUND

A greenhouse gas (GHG) inventory is a list of emission sources and the associated emissions quantified using standardized methods. Organizations develop GHG inventories for a variety of reasons. A GHG inventory, and related reporting, may include emissions categorized under three scopes. Scope 1 are direct GHG emissions that occur from sources that are controlled or owned by an organization (for example, emissions associated with fuel combustion in boilers, furnaces, vehicles). Scope 2 emissions are indirect GHG emissions associated with the purchase of electricity, steam, heat, or cooling. Although Scope 2 emissions physically occur at the facility where they are generated, they are accounted for in an organization's GHG inventory because they are a result of the organization's energy use.

Scope 3 emissions are the result of activities from assets not owned or controlled by the reporting organization or enterprise, but that the organization indirectly affects in its value chain. An organization's value chain consists of both its upstream and downstream activities. Scope 3 emissions, also referred to as value chain emissions, may often represent the majority of an organization's total GHG emissions.

SUMMARY

Disclosed herein are methods and apparatus of reporting the energy consumption of individual customers of a multi-user installation, including determining the fixed system energy consumption of the installation attributable to the individual customers. In an example, a device determines a base load energy of a data transmission system over a time interval. Further, the device generates a report of energy consumption attributed to a customer of the data transmission system based on the base load energy of the data transmission system over the time interval weighted by a fraction of a capacity hired by the customer, and the energy attributable to data of the customer transmitted at a determined data rate over the time interval.

In a further example, the report of energy consumption attributed to the customer is generated further based on an actual data rate of the data of the customer. Additionally or alternatively, the determined data rate is a measured data rate. Additionally or alternatively, the determined data rate is an estimated data rate. Additionally or alternatively, the determined data rate is an average data rate.

Additionally or alternatively, the device transmits the energy consumption report to the customer. Additionally or alternatively, the device transmits the energy consumption report to a recipient of the data. Additionally or alternatively, the device transmits the energy consumption report to the data transmission system. Additionally or alternatively, the device transmits the energy consumption report to a content distribution network.

In a further example, the device is a WTRU. Additionally or alternatively, the device is a network node. Additionally or alternatively, the device is a base station, such as a gNB.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
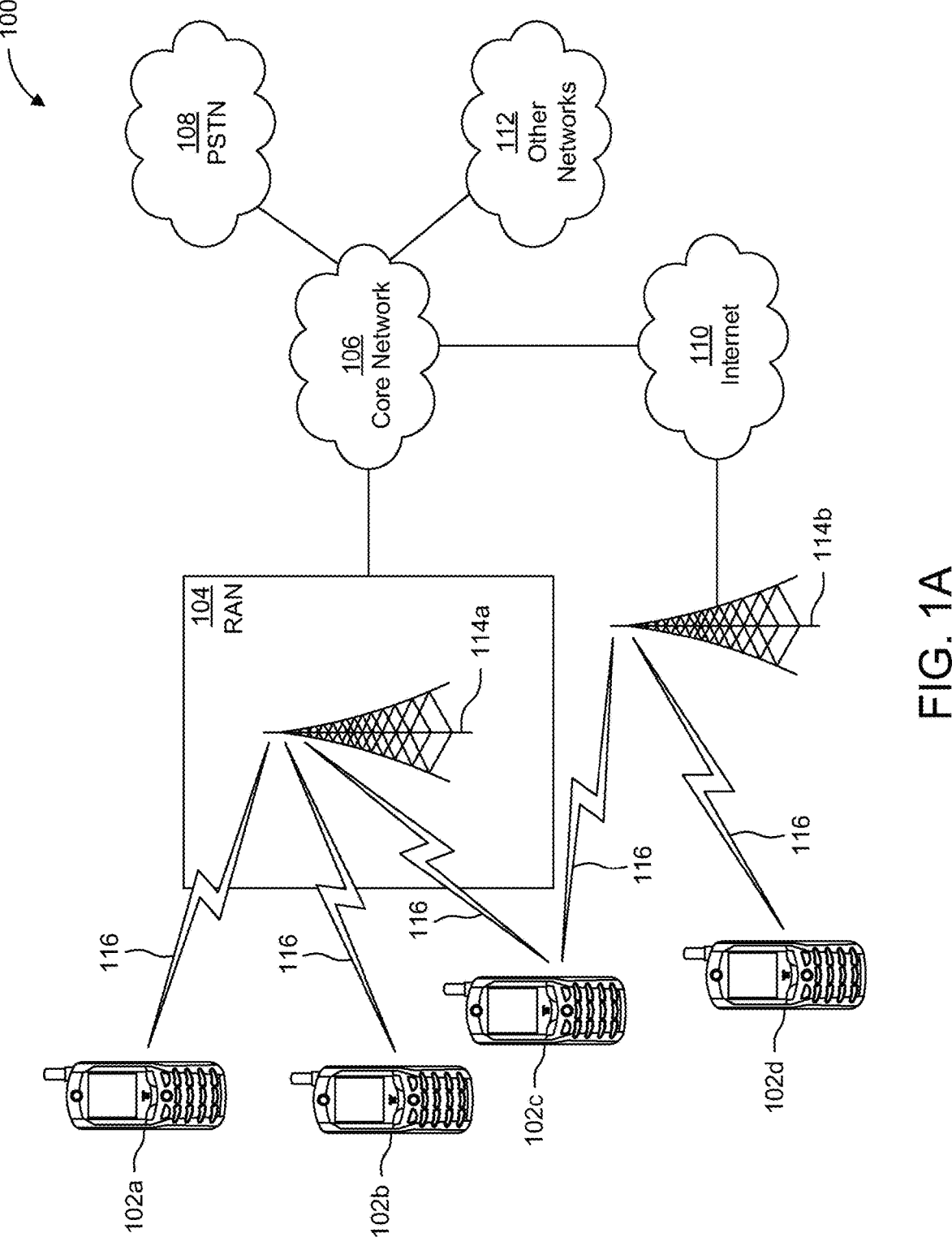
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
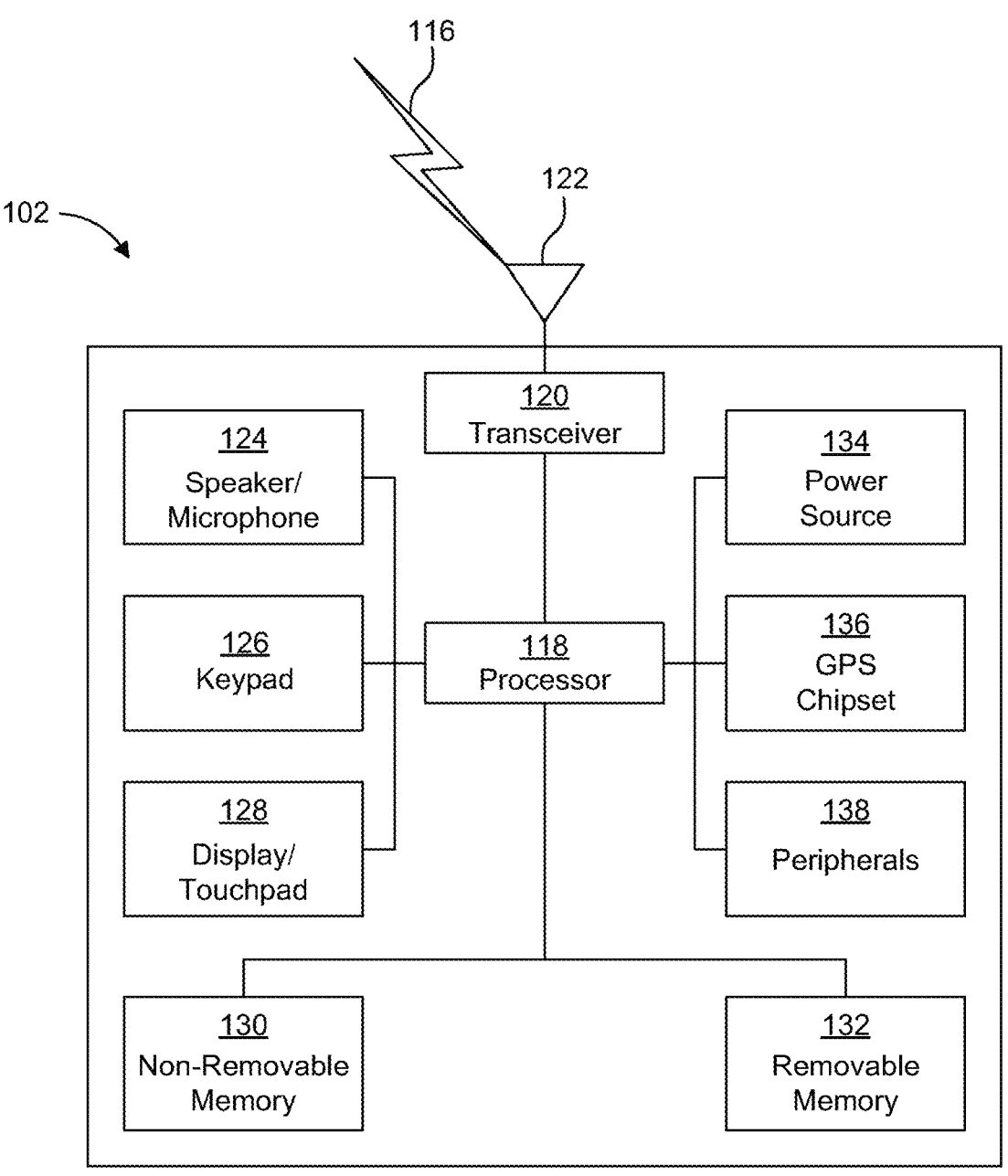
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB)

port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
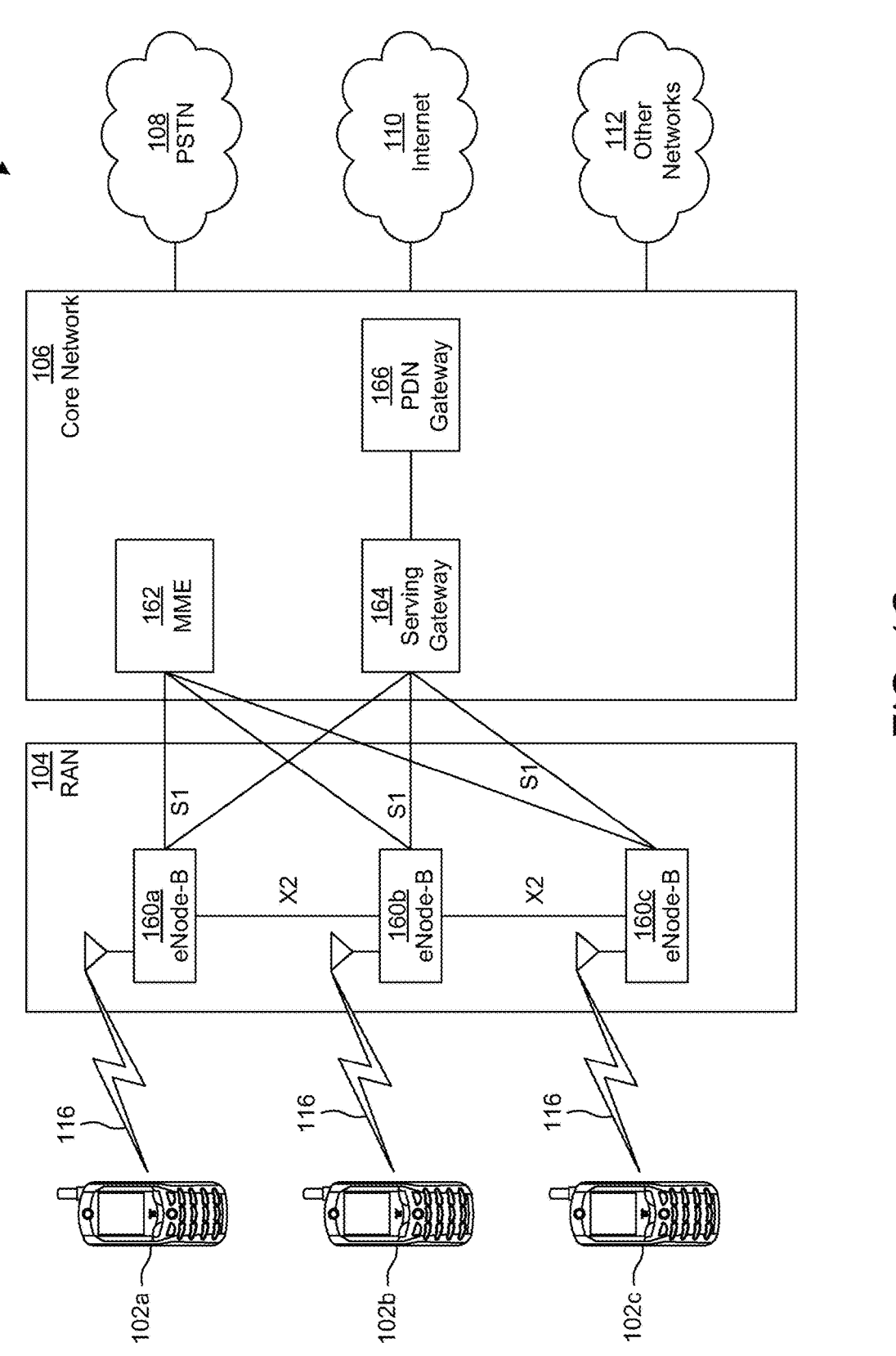
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
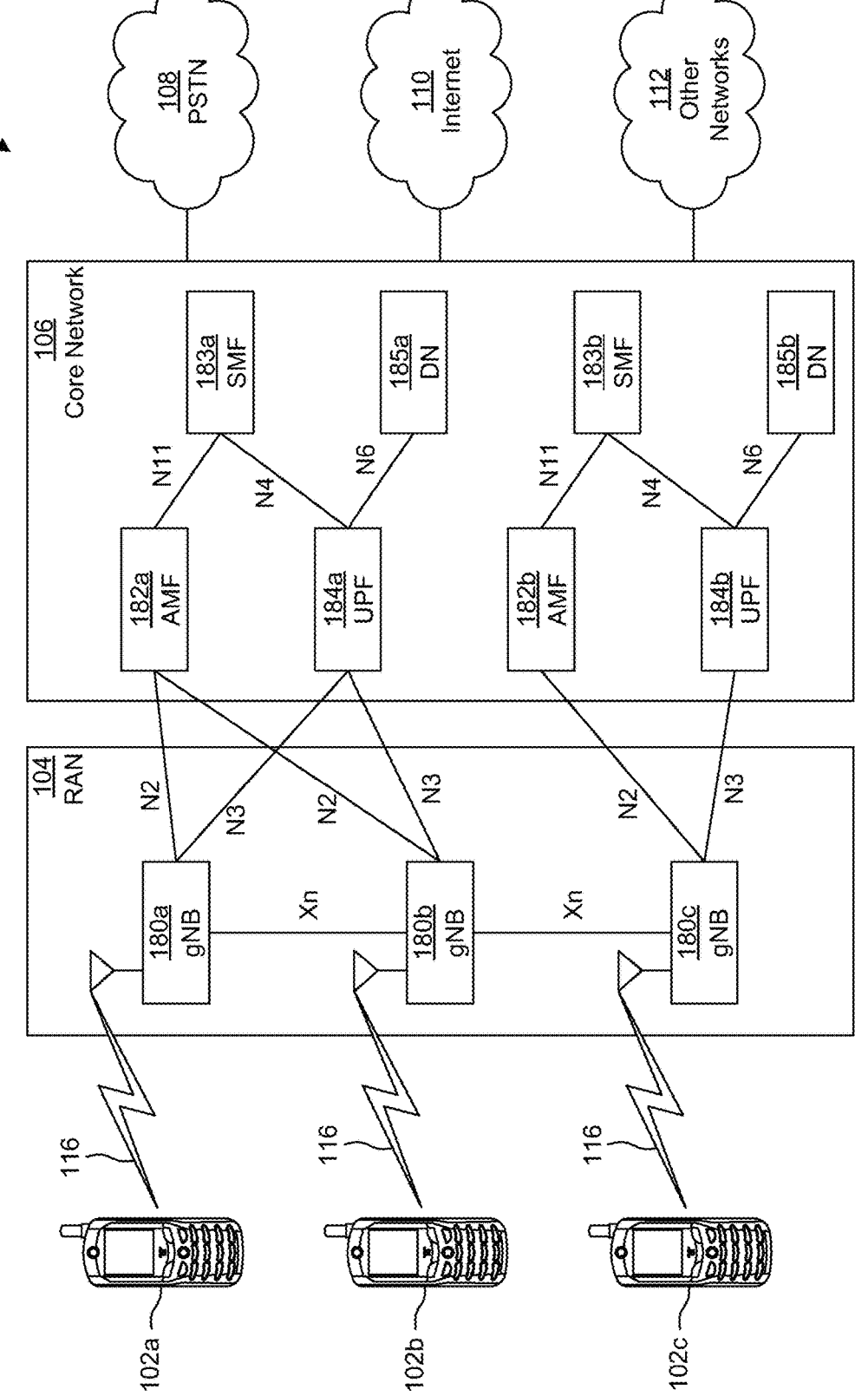
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3$^{RD}$ Generation Partnership Project (3GPP) access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Data transmission systems use significant amounts of energy, serving a potentially large number of customers. For reporting purposes, notably Scope 3 reporting as required by the European Union, it is important to determine the energy used for each customer. The present embodiments and examples describe a method for determining the amount of energy associated with a single data-stream as it passes through a multi-user installation. Similar methods are described in European Patent Application No. 24306657.8, filed Oct. 10, 2024, the contents of which are incorporated herein by reference in their entirety.

In a further advancement, the present embodiments and examples describe a method for determining the amount of energy associated with an individual customer of the multi-user installation. More specifically, the fixed system energy consumption of the multi-user installation attributable to the individual customer is determined.

The reporting of energy consumption is desirable, as this gives a high-level measure of environmental impact. If one is interested in the energy used by a given device, then the device could be measured, either by a wall-plug that measures power-consumption or energy-consumption, or by built-in measurement hardware. However, if the energy consumption of a given service is to be measured, a variety of complications may arise. A service in this instance could include sending a video over a mobile network, broadcasting a television program, encoding a video in a datacenter, caching and serving a content by a content delivery network (CDN), receiving a file over fiber and transmitting it over WiFi, the processing of data by an internet service provider, and so forth. Some devices involved in providing such services may include server racks, WiFi routers, set-top boxes, repeaters etc. These types of devices implicate that multiple data-streams may be processed at the same time; and energy use and the presence of data are only weakly correlated, meaning that a device, system, center, or installation may have a fixed energy overhead which is independent of the amount of data transmitted, as shown in FIG. 2.

Figure 2:
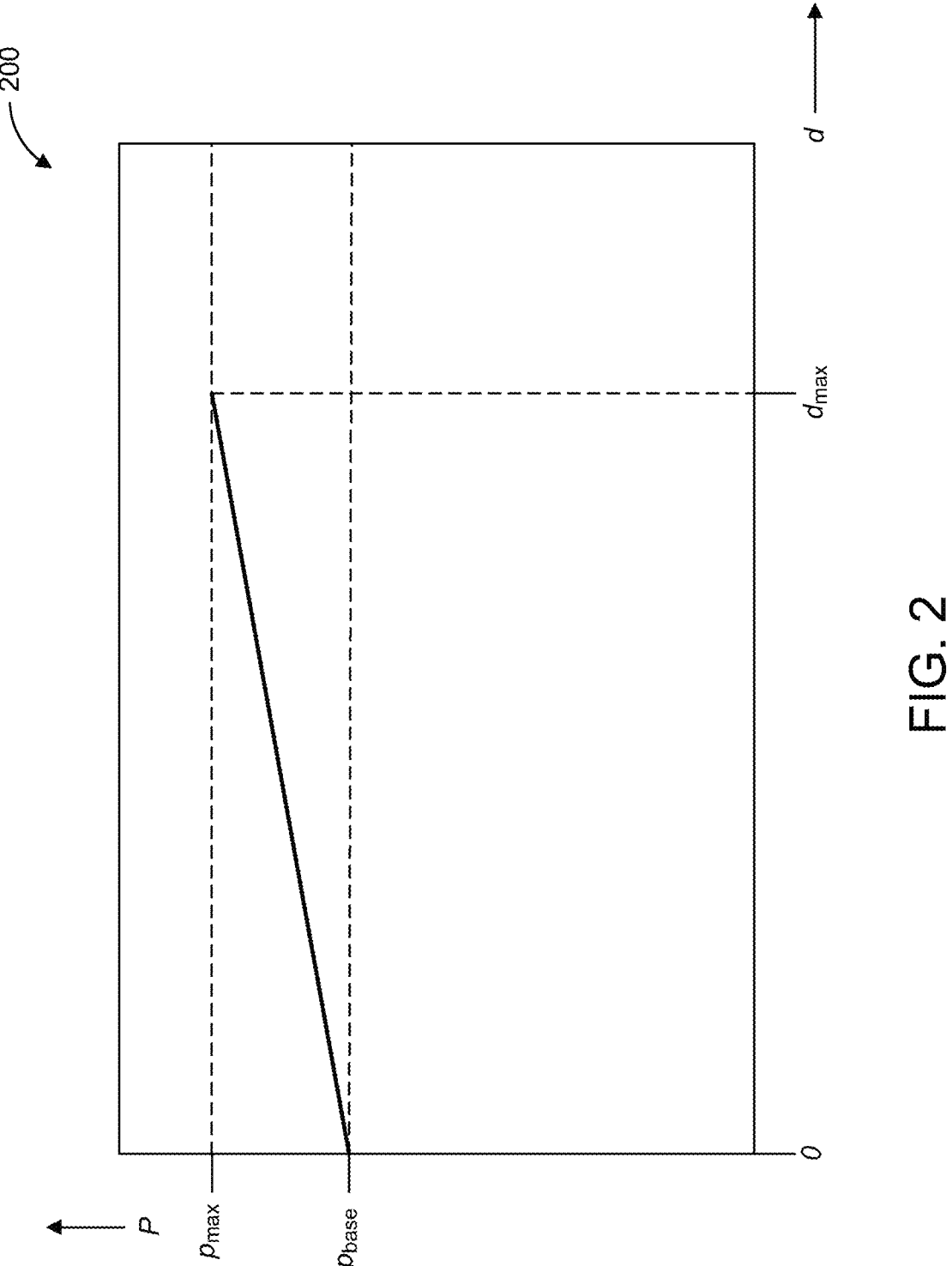
FIG. 2 is a graph diagram illustrating an example of the relationship of data rate and power, including a base load power.

FIG. 2 is a graph diagram illustrating an example of the relationship of data rate and power, including a base load power. As shown in an example in graph diagram 200, even at a data rate of zero (0), an installation consumes a base load of power which is always present. This base load of power may be considered to be a fixed energy overhead.

For such devices or installations, particularly multi-user installations, associating an amount of energy used to a given data stream is a non-trivial task. Further, such devices will still use a significant amount of energy even if no data passes through. The present embodiments and examples therefore propose an energy determination, accounting and reporting solution for associating energy use with a data-stream passing through a device, system, service center or installation. A key feature of the solutions provided herein is that the reported energy is related to measured data rates, as well as a few fixed system parameters that can be determined ahead of time.

The devices and installations involved in the transmission of data (such as data centers, CDNs (content delivery networks), Wi-Fi-routers, etc.) can each be adequately modeled using a power model, whereby the power P (in Watts) drawn relates to the data-rate d (in bits/second) as follows:

$$P = p_{base} + \frac{p_{max} - p_{base}}{d_{max}} d \qquad \text{Eq. 1}$$

where $p_{base}$ is the base load which is always present (due to cooling requirements, losses incurred by power transformers, activity of transmitters and receivers, and the like), $p_{max}$ is the maximum power drawn, which occurs when the system functions at maximum capacity, in other words, with a data-rate $d_{max}$. Note that derived energy units can be used equivalently, including for example kW, MW, kb/s, MB/s.

Figure 3:
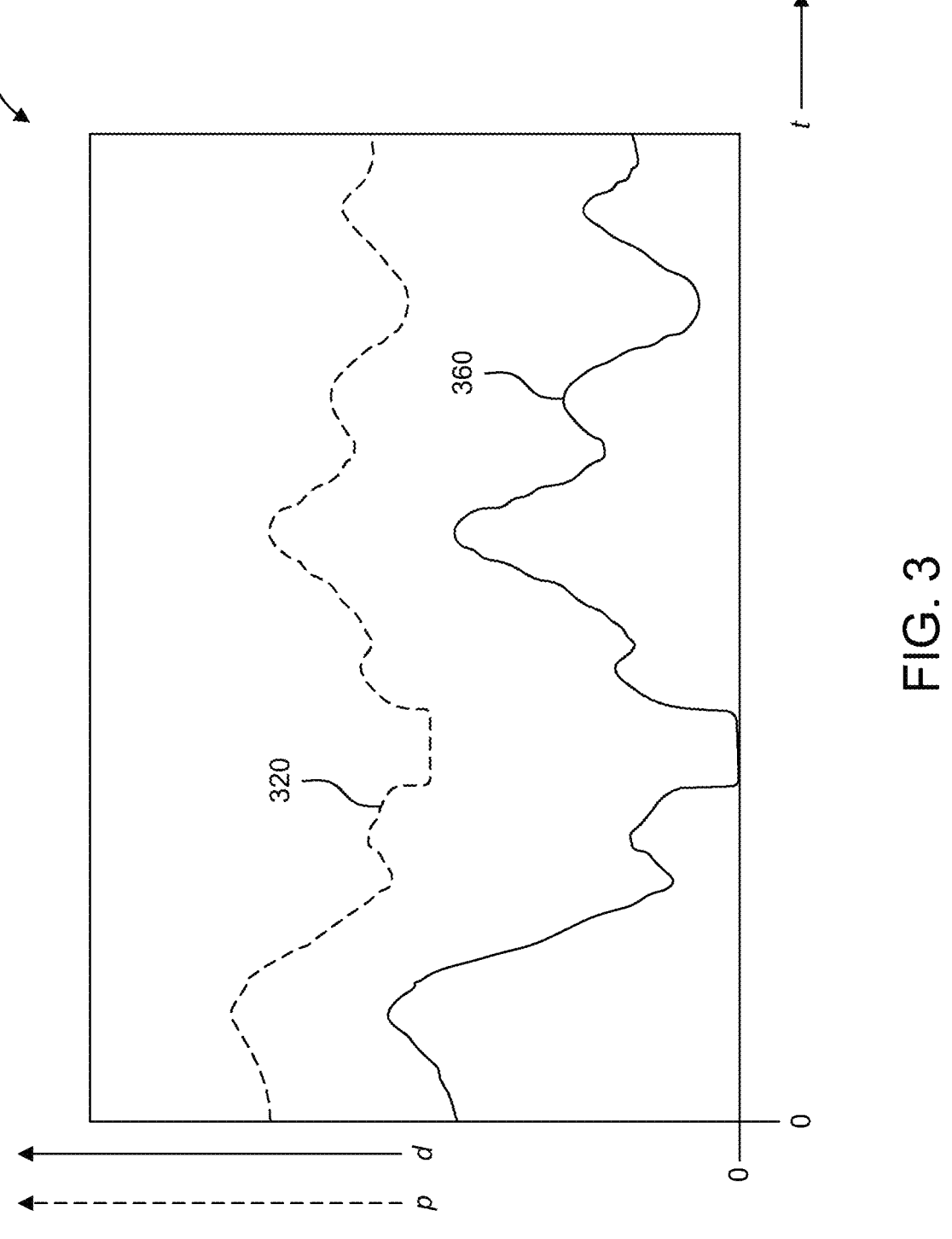
FIG. 3 is a graph diagram illustrating an example of data rate and power as a function of time.

FIG. 3 is a graph diagram illustrating an example of data rate and power as a function of time. As shown in graph diagram 300, and in the embodiments and examples that follow, the assumption holds that the data-rate d can vary over time 360, and that therefore the power drawn will vary over time 320 as well. For a given time-interval $(t_1, t_2)$, the energy E consumed (in Watt-seconds, or derived quantities such as Wh, kWh) can be determined as follows:

$$E(t_1, t_2) = \int_{t_1}^{t_2} P(t) dt \qquad \text{Eq. 2}$$

This can be rewritten as:

$$E(t_1, t_2) = \int_{t_1}^{t_2} \left( p_{base} + \frac{p_{max} - p_{base}}{d_{max}} d(t) \right) dt \qquad \text{Eq. 3}$$

This simplifies to:

$$E(t_1, t_2) = p_{base}(t_2 - t_1) + \frac{p_{max} - p_{base}}{d_{max}} \int_{t_1}^{t_2} d(t) dt \qquad \text{Eq. 4}$$

Thus, the energy used in the time interval $(t_1, t_2)$ consists of a fixed component, and a data-rate dependent component.

For a datacenter, internet service provider, content distribution network, and similar installations, the energy of the installation in time interval $(t_1, t_2)$ is therefore given by:

$$E_{center}(t_1, t_2) = E(t_1, t_2) \qquad \text{Eq. 5}$$

If there are $N_i$ customers (or equivalently subscribers) in time interval $i=(t_1, t_2)$, then the data-rate $d(t)$ for any time between $t_1$ and $t_2$ witnessed in the installation can be attributed to each customer $n_i$ pro-rata, in other words:

$$d(t) = \sum_{n_i=1}^{N_i} d(n_i, t) \le d_{max} \qquad \text{Eq. 6}$$

The energy used by the installation can be written as:

$$E_{center}(t_1, t_2) = p_{base}(t_2 - t_1) + \frac{p_{max} - p_{base}}{d_{max}} \int_{t_1}^{t_2} \sum_{n_i=1}^{N_i} d(n_i, t) dt \qquad \text{Eq. 7}$$

In addition, the energy used by customer $n_i$ is given by:

$$E_{n_i}(t_1, t_2) = \frac{p_{base}(t_2 - t_1)}{N_t} + \frac{p_{max} - p_{base}}{d_{max}} \int_{t_1}^{t_2} d(n_i, t) dt \qquad \text{Eq. 8}$$

Figure 4:
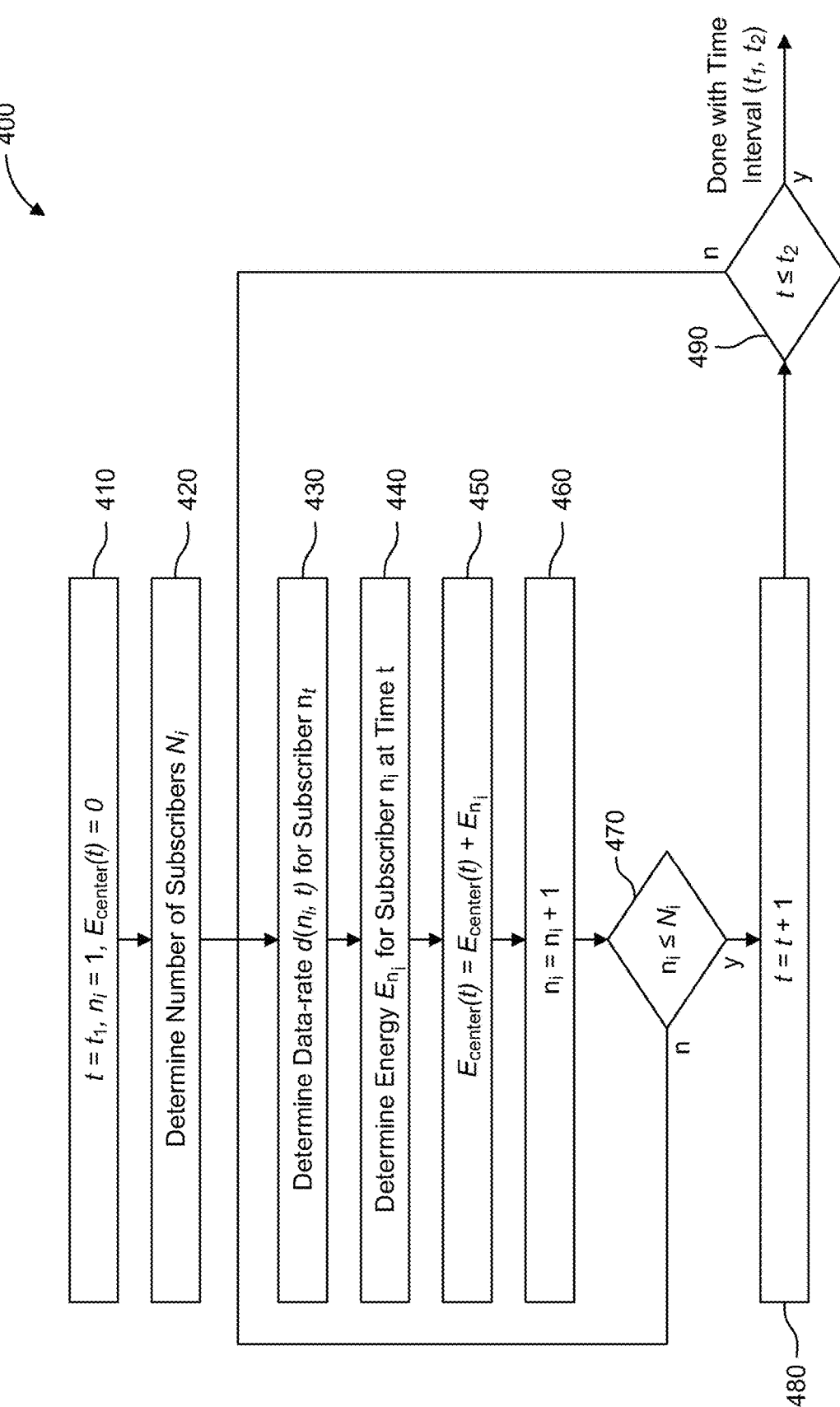
FIG. 4 is a flowchart diagram illustrating an example of a procedure to determine energy consumed by a data center at a given time.

FIG. 4 is a flowchart diagram illustrating an example of a procedure to determine energy consumed by a data center at a given time. As shown in flowchart diagram 400, the initial variable may be set 410, with $t=t_1$, $n_i=1$, $E_{center}(t)=0$.

Further, the number of customers or subscribers, $N_i$, may be determined 420. The data rate $d(n_i, t)$ is then determined 430 for customer or subscriber $n_i$. Also, the energy $E_{n_i}$ is determined 440 for customer or subscriber $n_i$ at time t.

Then, the energy of the center is updated 450 with the determined energy for the customer or subscriber as follows: $E_{center}(t)=E_{center}(t)+E_{n_i}$. The customer variable is then incremented to the next customer or subscriber 460. Further, if the customer or subscriber for which energy consumption is being determined is not the final customer or subscriber of the center 470, then the procedure continues for the next customer or subscriber. If it is the final customer or subscriber, then the time variable is incremented to the next time 480. Moreover, if the time variable has not yet reached beyond the final time, then then the procedure continues for the next time 490. If it reaches beyond the final time, then the procedure is done with or has completed calculations for time interval $(t_1, t_2)$.

Note that in the above equations the number of customers $N_i$ is assumed to remain constant over time interval i. If the number of customers changes, the start and end times of a time interval can correspond to the arrival or departure of a customer. Additionally or alternatively, the equations can be modified trivially to accommodate a varying number of customers for each time t in a time interval i. For example, assuming that at time t there are $N_t$ customers, then the energy for the center and the energy for customer $n_t$ are:

$$E_{center}(t_1, t_2) = p_{base}(t_2 - t_1) + \frac{p_{max} - p_{base}}{d_{max}} \int_{t_1}^{t_2} \sum_{n_t=1}^{N_t} d(n_t, t)dt \qquad \text{Eq. 9}$$

$$E_{n_t}(t_1, t_2) = \frac{1}{N_t}(t_2 - t_1) + \frac{p_{max} - p_{base}}{d_{max}} \int_{t_1}^{t_2} d(n_t, t)dt \qquad \text{Eq. 10}$$

The sum of energies used by all customers is equal to the energy used by the installation:

$$E_{center}(t_1, t_2) = \sum_{n_i=1}^{N_i} E_{n_i}(t_1, t_2) \qquad \text{Eq. 11}$$

Finally, if the data-rate $d(n_t, t)$ over time interval $(t_1, t_2)$ is constant for customer $n_t$, then the above equation can be simplified as follows:

$$E_{n_i} = (t_2 - t_1)\left(\frac{p_{base}}{N_t} + \frac{p_{max} - p_{base}}{d_{max}} d(n_i, t)\right) \qquad \text{Eq. 12}$$

The above two equations for $E_{n_i}$ constitute a method whereby the data-rate along with the number of customers are the only two variables required to determine the energy used by a single customer at a given time interval. The remaining parameters are constants which depend on the configuration of the installation.

The values determined with this method may be reported in several different ways. For example, it would be possible to report energy-related information through IP-queries, for example by sending an HTTP request to an IP address with a specific pre-defined port. The values may also be attached as metadata to (video-) streams passing through each installation/center. In one example, this would allow an end-user to know the energy consumed during the transmission of the data he/she is consuming. Such data may also subsequently be sent back to the sender, for example to a broadcaster via a return-channel mechanism, such as provided in European Patent Application No. 24314189.1, filed Apr. 18, 2024, the contents of which are incorporated herein by reference in their entirety.

In a further example, in the context of mobile communications, the energy-usage data may be queried and supplied through appropriate interfaces as defined by 3GPP.

In an example solution variant, the installation itself is considered to be responsible for the fixed component, in which case the reporting for customer $n_t$ becomes:

$$E_{n_i}(t_1, t_2) = \frac{p_{max} - p_{base}}{d_{max}} \int_{t_1}^{t_2} d(n_i, t)dt \qquad \text{Eq. 13}$$

The component for which the installation itself is responsible is then:

$$E_{installation} = p_{base}(t_2 - t_1) \qquad \text{Eq. 14}$$

and the total energy used by the center is given by:

$$E_{center}(t_1, t_2) = E_{installation} + \sum_{n_i=1}^{N_i} E_{n_i}(t_1, t_2) \qquad \text{Eq. 15}$$

This example solution variant could be useful for times when there are only a few users, or when there is no data flowing through the installation at all. For example, this could be useful if there are no users or too few users to attribute the fixed overhead to.

The mechanism of accounting disclosed in this example solution variant is also applicable to personal devices such as in-home WiFi routers. In this case, it may be assumed that there are several end-users who are using the internet at the same time, for example for streaming audio or video, downloading game data or using a telephone. Each of these activities will cause a certain data-rate, which may vary over time. The relationship between power and data-rate in a WiFi-router is well-modeled by the plot in FIG. 2, which means that determination or accounting of energy use of a WiFi router can be defined as:

$$E_{router} = E_{fixed} + \sum_{n_i=1}^{N_i} E_{n_i}(t_1, t_2) \qquad \text{Eq. 16}$$

where in this case $N_i$ refers to the number of applications sending or receiving data through the router in question. $E_{router}$ and $E_{fixed}$ are the energy used by the router and the non-data-dependent part of the energy consumed by the router respectively.

In another example solution variant, devices that do not service multiple customers may also report their energy consumption. A television, for example, will typically receive a single stream of data at any one time. While the energy usage and reporting of the television as function of the display functionality has been described in prior approaches, such as in European Patent Application No. 24314189.1, the energy usage as function of the communication aspect of a television may be accounted for using the method described in this disclosure. The method is adapted to this use case by setting the number of customers to 1, i.e. $N_i=1$. The energy to be reported is then given by:

$$E_{television} = p_{base}(t_2 - t_1) + \frac{p_{max} - p_{base}}{d_{max}} \int_{t_1}^{t_2} d(t)dt \qquad \text{Eq. 17}$$

whereby the constants may relate to the receiving and processing of data prior to display. Additionally or alternatively, they may relate to the full functionality of a television, noting that in the absence of signal, a television in the on-state consumes a non-trivial amount of energy. This example solution variant may also apply to any other single-user device such as a set-top box.

In a further example solution variant, data centers and similar structures are dimensioned by peak capacity, and likewise customers hire portions of data centers according to their expected peak data requirements. A reasonable manner to amortize the base energy load over the available customers, is to partition the base load according to the capacity that each customer is hiring. The capacity can be measured as a data rate, for example, but it is noted that other measures may equally be defined, including but not limited to the number of central processing unit (CPU)/graphics processing unit (GPU) cores, number of server racks, or the number of floating point operations per second.

The capacity hired by customer n may be indicated with the variable $c_n$, and the total capacity of the installation may be indicated with C. If the total number of customers under contract with the installation is N, then the following equation holds:

$$C = \sum_{n=1}^{N} c_n \qquad \text{Eq. 18}$$

For a given time interval, a customer $n_t$ would have a hired capacity of $c_{n_t}$. The fraction of the total capacity hired by customer $n_t$ is then $c_{n_t}/C$. As a result, the installation's energy use to be attributed to the customer $n_t$ will be:

$$E_{n_t}(t_1, t_2) = \frac{c_{n_t}}{C} p_{base}(t_2 - t_1) + \frac{p_{max} - p_{base}}{d_{max}} \int_{t_1}^{t_2} d(n_t, t)dt \qquad \text{Eq. 19}$$

The total amount of energy used by the installation that can be attributed to customers is then:

$$E_{attributed}(t_1, t_2) =$$
$$p_{base}(t_2 - t_1) \sum_{n_t=1}^{N_t} \frac{c_{n_t}}{C} + \frac{p_{max} - p_{base}}{d_{max}} \int_{t_1}^{t_2} \sum_{n_t=1}^{N_t} d(n_t, t)dt \qquad \text{Eq. 20}$$

The base load energy not attributed to any customers in this time interval will be:

$$E_{not\,attributed}(t_1, t_2) = p_{base}(t_2 - t_1) \sum_{n_t=N_t+1}^{N} \frac{c_{n_t}}{C} \qquad \text{Eq. 21}$$

The total energy used by the installation is:

$$E_{center}(t_1, t_2) = E_{attributed}(t_1, t_2) + E_{not\,attributed}(t_1, t_2) \qquad \text{Eq. 22}$$

While it is reasonable to attribute to the data center itself the part of the base load energy that was used to provide capacity for customers that are not currently using the center, the above variant does afford a further refinement. The issue is that a customer that is hiring a large capacity $c_n$, but is using a small portion of it (i.e. a low data rate d), is attributed the full base load energy associated with the hired capacity.

In yet another example solution variant, it is possible to attribute the base load energy according to some function $f(\ )$ which itself is dependent on at least the actual data rate. The energy attributed to customer $n_t$ is then:

$$E_{n_t}(t_1, t_2) = f(d(n_t, t)) \frac{c_{n_t}}{C} p_{base}(t_2 - t_1) + \frac{p_{max} - p_{base}}{d_{max}} \int_{t_1}^{t_2} d(n_t, t)dt \qquad \text{Eq. 23}$$

The requirements on the function $f(\ )$ are that $f(0) \geq 0$ and $f(d_{max}) \leq 1$. Note that in most cases $f(d_{max})$ would equal 1, where $d_{max}$ is the peak data rate available to customer $n_t$. The total energy attributed to the set of available customers in time interval $(t_1, t_2)$ is then:

$$E_{attributed}(t_1, t_2) = p_{base}(t_2 - t_1) \sum_{n_t=N_t+1}^{N} f(d(n_t, t)) \frac{c_{n_t}}{C} + \frac{p_{max} - p_{base}}{d_{max}} \int_{t_1}^{t_2} \sum_{n_t=N_t+1}^{N} d(n_t, t)dt \qquad \text{Eq. 24}$$

The installation's energy not attributed to any customers is then $$E_{not\,attributed}(t_1, t_2) = \qquad \text{Eq. 25}$$
$$p_{base}(t_2 - t_1) \left( \sum_{n_t=1}^{N_t} (1 - f(d(n_t, t))) \frac{c_{n_t}}{C} + \sum_{n_t=N_t+1}^{N} \frac{c_{n_t}}{C} \right)$$

The total energy used by the installation is:

$$E_{center}(t_1, t_2) = E_{attributed}(t_1, t_2) + E_{not\,attributed}(t_1, t_2) \qquad \text{Eq. 26}$$

Examples of functions $f(\ )$ that could be used include, but are not limited to:

$$f(d) = \frac{d}{d_{max}} \qquad \text{Eq. 27}$$

$$f(d) = \frac{d}{d + d_{max}} + 0.5 \qquad \text{Eq. 28}$$

$$f(d) = \frac{d}{d + d_{max}/k} + \frac{1}{k+1} \qquad \text{Eq. 29}$$

where $d_{max}$ is the maximum data rate available to customer $n_t$. The first of these three example functions is simply a linear scaling function. The second function is a non-linear example, whereby the presence of data triggers an attribution of the base load of at least 50% of the user's hired capacity (i.e. $f(0)=0.5$), and progressing non-linearly to $f(d_{max})=1$, i.e. full attribution when peak capacity is used. The third function is a refinement of the second function, whereby a constant k>0 is introduced which changes the shape of the function.

For example, for k=3, the presence of data will trigger an attribution of 25% of the user's hired capacity, while $f(d_{max})$ equals 1. Given that the value of k can be chosen freely, it can be set for example by a network operator to different values for different customers. It can also be set to different values at different times, for example linked to the amount of traffic an installation is witnessing.

Finally, this parameter can be linked to the concept of energy credits. In an example, the energy credits may operate as defined in 3GPP technical report TR 22.261, which is incorporated herein by reference.

Figure 5:
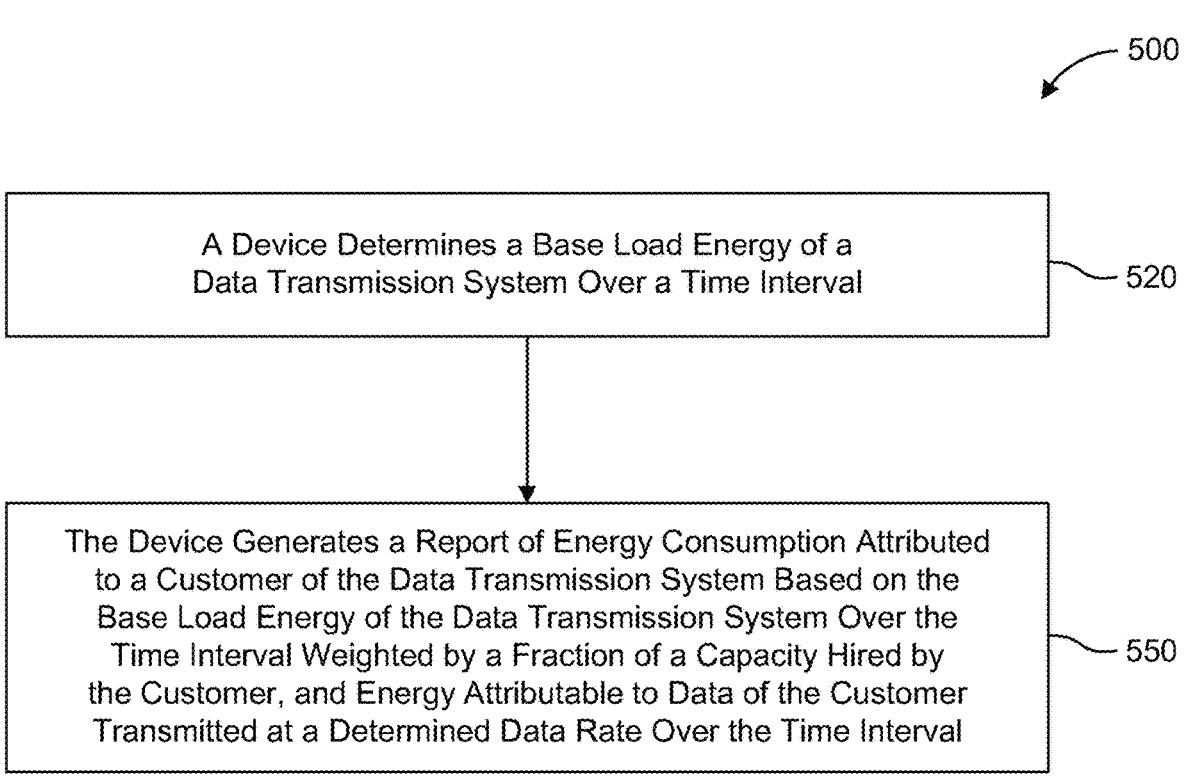
FIG. 5 is a flowchart diagram illustrating an example of a procedure to determine energy consumed by a customer of a data transmission system based on base energy load weighted by a capacity hired by the customer.

FIG. 5 is a flowchart diagram illustrating an example of a procedure to determine energy consumed by a customer of a data transmission system based on base energy load weighted by a capacity hired by the customer. As shown in an example in flowchart diagram 500, a device determines a base load energy of a data transmission system over a time interval 520. Further, the device generates a report of energy consumption attributed to a customer of the data transmission system based on the base load energy of the data transmission system over the time interval weighted by a fraction of a capacity hired by the customer, and the energy attributable to data of the customer transmitted at a determined data rate over the time interval 550.

In a further example, the report of energy consumption attributed to the customer is generated further based on an actual data rate of the data of the customer. Additionally or alternatively, the determined data rate is a measured data rate. Additionally or alternatively, the determined data rate is an estimated data rate. Additionally or alternatively, the determined data rate is an average data rate.

Additionally or alternatively, the device transmits the energy consumption report to the customer. Additionally or alternatively, the device transmits the energy consumption report to a recipient of the data. Additionally or alternatively, the device transmits the energy consumption report to the data transmission system. Additionally or alternatively, the device transmits the energy consumption report to a content distribution network.

In another example, the device is a WTRU. Additionally or alternatively, the device is a network node. Additionally or alternatively, the device is a base station, such as a gNB.

For energy consumption determination, accounting and reporting purposes, the apparatus and methods disclosed herein provide a way to understand the energy used by a single center/device to service a single customer. This would help the development of instrumentation techniques that would enable the reporting of energy used for each application. Notably, the aim is to develop instrumentation tools that would enable an assessment of the energy used for the transmission of data from a source to a sender. For such tools to operate meaningfully, a solution such as the one presented here would be crucial.

Given that the centers and devices considered here each have a significant fixed energy overhead, which is independent of the amount of data that passes through the system, apparatus and methods presented herein allow for flexibility as to how this fixed overhead is attributed. Also, apparatus and methods presented herein allow for flexibility as to how a base energy load according to a multi-user installation's capacity hired by a customer is attributed.

The example apparatus and methods presented herein are essential components useful for Scope 3 reporting of data communication systems. It would allow any single-user or multi-user installation to provide per-user information for energy reporting purposes.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a device, the method comprising:

transmitting data of a customer ($n_i$) at a determined actual data rate over a time interval ($p_{base}(t_2-t_1)$), wherein $p_{base}$ is based on a base load energy of a data transmission system and $t_2-t_1$ is the time interval between first time and second time;

receiving and determining energy attributable to the data of the customer ($n_i$) transmitted at the determined actual data rate over the time interval;

determining the base load energy of the data transmission system over the time interval ($p_{base}(t_2-t_1)$); and generating a report of energy consumption ($E_{n_i}(t_1, t_2)$) attributed to the customer ($n_i$) of the data transmission system based on the base load energy of the data transmission system over the time interval weighted by a fraction of a capacity hired by the customer ($n_i$), and the energy attributable to the data of the customer ($n_i$) transmitted at the determined actual data rate of the data of the customer ($n_i$) over the time interval, wherein:

$$E_{n_i}(t_1, t_2) = \frac{p_{base}(t_2 - t_1)}{N_t} + \frac{p_{max} - p_{base}}{d_{max}} \int_{t_1}^{t_2} d(n_i, t)dt,$$

wherein $N_t$ is based on a number of customers at time t, $p_{max}$ is based on a maximum power drawn by the data transmission system, $p_{base}$ is based on the base load of the data transmission system, $d_{max}$ is based on a maximum data rate, and $$\int_{t_1}^{t_2} d(n_i, t)dt$$

is based on a data rate of the customer ($n_i$) over the time interval.

2. The method of claim 1, wherein the determined actual data rate of the data of the customer ($n_i$) is a measured data rate.

3. The method of claim 1, wherein the determined actual data rate of the data of the customer ($n_i$) is an average data rate.

4. The method of claim 1, further comprising:

transmitting the report of energy consumption to the customer ($n_i$).

5. The method of claim 1, further comprising:

transmitting the report of energy consumption to a recipient of the data.

6. The method of claim 1, further comprising:

transmitting the report of energy consumption to the data transmission system.

7. The method of claim 1, further comprising:

transmitting the report of energy consumption to a content distribution network.

8. The method of claim 1, wherein the device is one or more of: a wireless transmit/receive unit (WTRU), a base station, or a network node.

9. The method of claim 1, wherein:

$$E_{n_t}(t_1, t_2) = f(d(n_t, t))\frac{c_{n_t}}{C}p_{base}(t_2 - t_1) + \frac{p_{max} - p_{base}}{d_{max}} \int_{t_1}^{t_2} d(n_t, t)dt,$$

21                                            22 wherein $f(d(n_i, t))$ is based on the actual data rate of the customer ($n_i$) over the time interval, and $$\frac{c_{n_i}}{C}$$

5 is based on the fraction of the capacity hired by the customer ($n_i$).

10. A device comprising:

a processor; and a transceiver, operatively coupled to the processor; wherein:

the processor and the transceiver are configured to transmit data of a customer ($n_i$) at a determined actual data rate over a time interval ($p_{base}(t_2-t_1)$, wherein $p_{base}$ is based on a base load energy of a data transmission system and $t_2-t_1$ is the time interval between first time and second time;

the processor is configured to receive and determine energy attributable to the data of the customer ($n_i$) transmitted at the determined actual data rate over the time interval;

the processor is configured to determine the base load energy of the data transmission system over the time interval ($p_{base}(t_2-t_1)$); and the processor and the transceiver are configured to generate a report of energy consumption ($E_{n_i}(t_1, t_2)$) attributed to the customer ($n_i$) of the data transmission system based on the base load energy of the data transmission system over the time interval weighted by a fraction of a capacity hired by the customer ($n_i$), and the energy attributable to the data of the customer ($n_i$) transmitted at the determined actual data rate of the data of the customer ($n_i$) over the time interval, wherein:

$$E_{n_i}(t_1, t_2) = \frac{p_{base}(t_2 - t_1)}{N_t} + \frac{p_{max} - p_{base}}{d_{max}} \int_{t_1}^{t_2} d(n_i, t)dt,$$

40 wherein $N_t$ is based on a number of customers at time t, $p_{max}$ is based on a maximum power drawn by the data transmission system, $p_{base}$ is based on the base load of the data transmission system, $d_{max}$ ☐ is based on a maximum data rate, and $$\int_{t_1}^{t_2} d(n_i, t)dt$$

is based on a data rate of the customer ($n_i$) over the time interval.

11. The device of claim 10, wherein the determined actual data rate of the data of the customer ($n_i$) is a measured data rate.

12. The device of claim 10, wherein the determined actual data rate of the data of the customer ($n_i$) is an average data rate.

13. The device of claim 10, wherein the processor and the transceiver are further configured to transmit the report of energy consumption to the customer ($n_i$).

14. The device of claim 10, wherein the processor and the transceiver are further configured to transmit the report of energy consumption to a recipient of the data.

15. The device of claim 10, wherein the processor and the transceiver are further configured to transmit the report of energy consumption to the data transmission system.

16. The device of claim 10, wherein the processor and the transceiver are further configured to transmit the report of energy consumption to a content distribution network.

17. The device of claim 10, wherein the device is one or more of: a wireless transmit/receive unit (WTRU), a base station, or a network node.

18. The device of claim 10, wherein:

$$E_{n_i}(t_1, t_2) = f(d(n_t, t))\frac{c_{n_i}}{C} p_{base}(t_2 - t_1) + \frac{p_{max} - p_{base}}{d_{max}} \int_{t_1}^{t_2} d(n_t, t)dt,$$

wherein $f(d(n_i, t))$ is based on the actual data rate of the customer ($n_i$) over the time interval, and $$\frac{c_{n_i}}{C}$$

is based on the fraction of the capacity hired by the customer ($n_i$).

*    *    *    *    *